Dec. 9, 1969   P. DOSCH ET AL   3,483,082
NUCLEAR REACTORS SHUTDOWN
Filed Oct. 10, 1966   3 Sheets-Sheet 1

INVENTORS:
PETER DOSCH
HANS-JOACHIM KRAUSS
HANS UHRIG
By: Burgen, Dinklage & Sprung INVENTORS:
PETER DOSCH
HANS-JOACHIM KRAUSS
HANS UHRIG
By: Burgess, Dinklage & Sprung

United States Patent Office 3,483,082
Patented Dec. 9, 1969

3,483,082
NUCLEAR REACTORS SHUTDOWN
Peter Dosch, Wattwill, Switzerland, and Hans J. Kraus, Karlsruhe-Weiherfeld, and Hans Uhrig, Karlsruhe, Germany, assignors to Gesellschaft fur Kernforschung m.b.H., Karlsruhe, Germany, a corporation of Germany
Continuation-in-part of application Ser. No. 268,836, Mar. 28, 1963. This application Oct. 10, 1966, Ser. No. 593,257
Claims priority, application Germany, Mar. 30, 1962, K 46,328; Aug. 8, 1962, K 47,459; Nov. 3, 1962, K 48,138; Dec. 18, 1962, K 48,500
Int. Cl. G21c 9/00
U.S. Cl. 176—36                                 14 Claims

ABSTRACT OF THE DISCLOSURE

System for shutting down nuclear reactors including a safety rod and means for actuating the safety rod. The actuating means is an electromagnetic impulse generator, which generates a repulsive force.

---

This application is a continuation-in-part of application Ser. No. 268,836, filed Mar. 28, 1963, now abandoned.

The invention relates to the shutdown of nuclear reactors with the aid of safety rods, whereby for the purpose of shutting off the reactor, rods are shifted from a position of readiness with the aid of an electromagnet, peller device is used to accelerate the rods.

A familiar type of arrangement is the one whereby the safety rods of nuclear reactors in operation are held in a position of readiness with the aid of an electromagnet, particularly above the reactor's fission zone, and shifted to a cutoff position on breaking the magnetic current, either by gravity alone or by gravity and an impelling device such as pneumatic means, hydraulic means, or a spring-loading.

As a rule, these devices are unsuited for the purpose of intercepting in good time highly precipitate operating faults such as are apt to occur in reactors, inasmuch as considerable time is required for the speeding of the shut-off rods from the position of rest to the terminal velocity.

This disadvantage can be obviated in a simple manner, if pursuant to the invention an impulse generator is employed as an impelling device. Impulse generators of the type used have been known for a considerable time as drives of electrical switches and similar devices, where relatively small masses are to be accelerated. It has now been found, surprisingly, that the impulse generators can be used to excellent advantage as impelling devices for safety rods in nuclear reactors, although the masses to be accelerated are relatively large. Since, however, the elements are designed in manner to give them relative stability, they are capable of withstanding an extremely brief and high-powered surge.

By way of impulse generators resort may be had both to the conventional detonating impulse generators, and, to particularly good advantage, electromagnetic impulse generators. These consist of a coil with a short-circuit ring resting against it. By impressing on the coil appropriately a short current impulse, the impulse energy is released in millisecond fractions.

The device pursuant to the invention can further be improved by fitting one or more impulse transmitting units of relatively small mass between the ram of the electromagnetic impulse generator, and the safety element which is to be displaced, which is of relatively high mass. In this connection, it is most expedient to stagger the masses of the impulse transmission units as far as the shutoff rod so that the effect of it is an optimal utilization of the power. The staggered mass distribution required for the purpose of effective impulse transmission, can be computed with precision to provide optimum operation. Further, the energy losses suffered in the impulse transmission can be further reduced, pursuant to another type of design of the invention, by devising the impulse transmission unit either entirely or only on the opposite contact faces, of such materials as ball bearing steel, beryllium bronze, etc. Thus, the opposite ends of the impulse transmission unit can be of such materials or the entire unit can be of such material. It is likewise advantageous to construct the impulse transmission units as thin-walled hollow bodies of a stock that is of a maximum hardness and elasticity, and filling these bodies with an inelastic material, such as lead, for the purpose of achieving the requisite mass. The filler does not participate in the deformation. To reduce the structural dimensions of the repeller device in question, resort can be had to nearly cylindrical bodies for the purpose of impulse transmission, these bodies exhibiting a lesser expansion of the width than spherical bodies.

The particular advantage of the impeller device just described resides primarily in the fact that where resort is had to an electromagnetic impulse generator, the shutdown rods attain their full speed after a lapse of only about a millisecond, which makes it feasible to control even very high speed (very precipitous) reactor faults. Moreover, in the case of resort to this principle, the shutoff action takes place with maximum dependability. In addition, the dimensions of the impeller device are so slight that they can be readily introduced into shutoff rod without any difficulty whatsoever.

Owing to the fact that shutting off of nuclear reactors, and particularly fast reactors, calls for preventing lags of the order of magnitude of even a few milliseconds, it is particularly expedient for the accelerating power of the impulse generator to represent a multiple of the holding power of the retaining device. In such an event, the safety element can be given a multiple of the requisite breaking energy through the impulse generator. This is likewise highly advantageous where the decay of the energy of the retaining device takes place slowly when it is disconnected.

It should also be mentioned that the term "safety element" here is intended to embrace both the shutoff rods made of absorbent stock and those made of fuel. A safety element, may of course, consist of one part absorbing material and another part fuel.

Where resort is had to electromagnetic devices, both for the retaining device and the impulse generator, it is highly advantageous to combine structurally the two electromagnetic devices. It is furthermore advantageous in such a case for the two electromagnetic devices to be provided with but a single exciting coil in common, the said coil being supplied from two circuits. To assure optimal efficiency with relatively low current intensity, the two current feed circuits are connected in such a manner that the exciting coil is supplied from them with voltages of opposite polarity. On the occurrence of a safety stop, both the negative and the positive steep branch of the hysteresis curve will traverse.

By resort to the invention, the mechanical lag of the safety elements can be reduced to less than 1 millisecond. However, should the end of the safety element by the travel of which the depth of submersion in the reactor core is altered, be found in a position of rest at the edge of the core or even outside of the core as is generally the case with conventional types of design, there occurs a lag in the reactivity rate of the rod, notwithstanding the very high rate of initial travel speed. This is due to the fact that the change of reactivity in the vicinity of the core edge, in relation to the movement of the safety element, is imperceptibly slight. It is greatest when the end travels within about the inner third of the core.

In order to prevent even this time lag, one may follow the principle of having the safety element, in its position of rest, project partially into the core, so that the travel of the end of the safety element will commence in a middle zone of the core. However, this arrangement would have the decisive disadvantage of bringing out non-homogeneity of the core structure with a deleterious effect on the operation of the reactor.

Pursuant to a further feature of the invention, the safety element consisting in this instance of fuel, is segmented (subdivided) and the parts are connected mutually with the aid of holding devices while the impulse generator meshes with a free end of the safety element, to the best advantage outside of the reactor's core. If the safety element consists, for example, of two parts, the point of severance should preferably fall beyond the upper third of the fuel element. In many instances one will enter somewhat closer to the middle, that is to say, into the critical segment of the fission zone. On activating the impulse generator, the upper part of the safety element transmits the impulse on the upper safety element part or parts. The latter will begin moving downward, whereas pursuant to a further feature of the invention, the upper part remains stationary. This assures an appreciable and immediate change of reactivity at the outset of the movement.

The safety element pursuant to the invention, designed as a fuel element, is best so designed from the structural standpoint, as to provide an intermediate ram which transmits directly the mechanical surge load from the impulse generator to the fuel element part which is to be displaced. Thus, for example, the metallic fuel element casing can be so designed as to transmit the thrust as a tubular ram. Naturally, under certain circumstances one may also provide rods or crosses auxiliary parts which hold the surge load at a remote point from the fuel element proper. It may also be advantageous, as already mentioned, to devise the parts of the fuel element mounted ahead of the fuel element part due to be displaced, as a shock transmitting unit, the masses whereof are graduated in a manner to assure an optimal utilization of the energy.

By way of a retaining device for the fuel element and for the parts of the fuel element where the safety rod is a fuel rod, resort may be had, for instance, to permanent magnets which are best made of high temperature resistant materials, and which retain their magnetic holdings strength even at higher temperatures. However, resort may also be had to holding devices which are destroyed on a shutdown, so that it becomes necessary to renew them on composing the fuel element. The essential point is only that of designing them in such a manner that they will hold together the individual parts with adequate safety. At the same time, caution has to be exercised so that they will but slightly affect the impact.

Thus, the invention provides a device for shutdown of nuclear reactors comprising a safety rod movable axially between a first position for normal reactor operation, and a second position for shutdown of the reactor, the first position, preferably, being at a higher elevation than the second position, whereby movement from the first position to the second position is aided by gravity. The device includes retaining means for retaining the safety rod in the first position during normal operation, and includes impeller means for actuation to accelerate movement from the first position to the second position, and the impeller means is an impulse generator, preferably an electromagnetic impulse generator.

The invention is further described in the accompanying drawings, wherein:

FIG. 3b is an elevation view, in cross-section, of the lower part of the device, the upper part of which is shown in FIG. 3a;

In the various views, like reference characters refer to corresponding parts.

Figure 1:
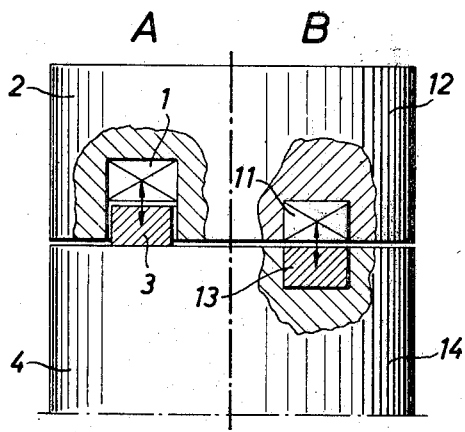
FIG. 1 is an elevation view with portions shown in cross-section illustrating constructions for an electromagnetic impulse generator for use in the device of the invention.

In FIG. 1 there is shown a diagrammatic sketch of two forms of the electromagnetic device.

In FIG. 1A, the exciter winding 1 is fitted inside the shielded magnet 2 and the copper ring 3, forming the short circuit of the impulse generator projects into the profile of the magnetic core 2. The copper ring 3 is fixedly connected to the armature portion 4 which in turn connects with the safety element.

In FIG. 1B, the short circuit ring 13 is built into the armature 14, while the coil 11 is entirely encompassed by the magnet 12. The construction shown in FIG. 1B requires less height. The short circuit ring may also partially project into the armature and into the magnetic core. Instead of copper, the short circuit ring can be made of another material having good electrical conductivity.

Figure 2:
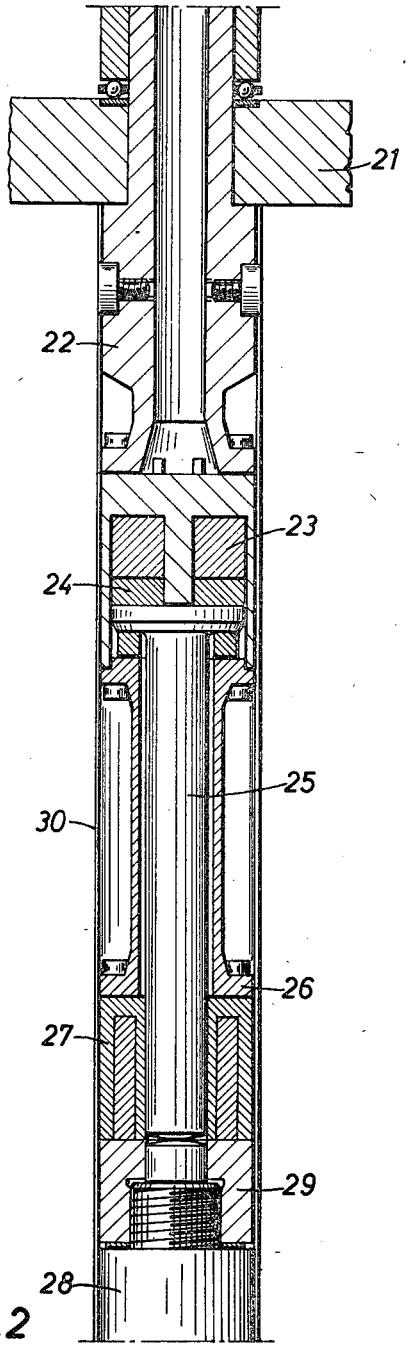
FIG. 2 is an elevation view, in cross-section, of a device according to the invention.

FIG. 2 shows a device pursuant to the invention wherein a holding device 22 is provided on a cover plate 21, the holding device supporting the impulse generator 23 which operates in conjunction with the short circuit ring 24 on the output ram 25. Furthermore, sleeve 26 is secured to the impulse generator, and secured to sleeve 26 is the retaining device 27 which holds the safety or shutdown rod 28 in the normal operating position. The shutdown rod 28 is equipped with a head 29 constructed of a magnetic stock. For the purpose of protection and guidance, the device as a whole is provided (surrounded) with a sleeve 30.

Figure 3A:
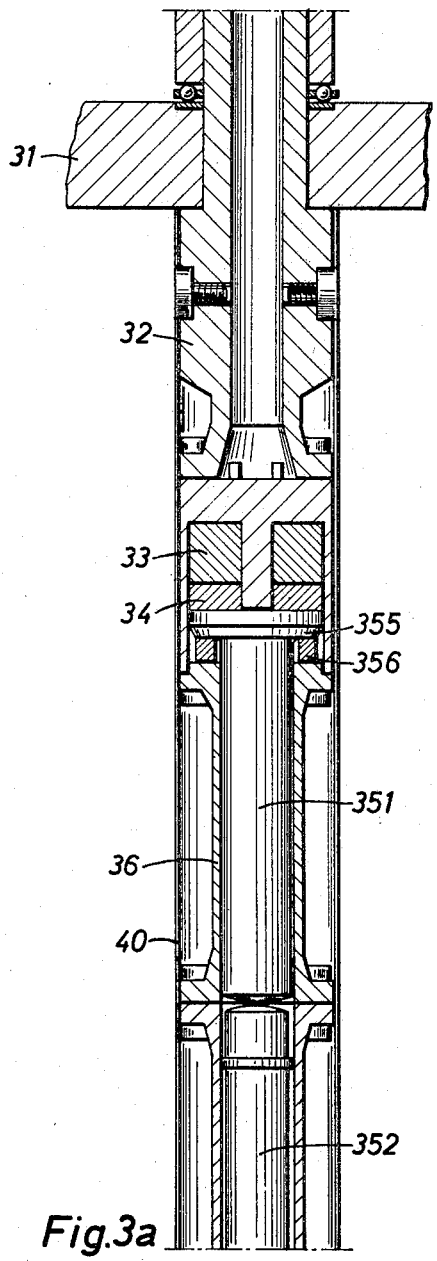
FIG. 3a is a view of the upper part of a modified form of the device of the invention.
Figure 3B:
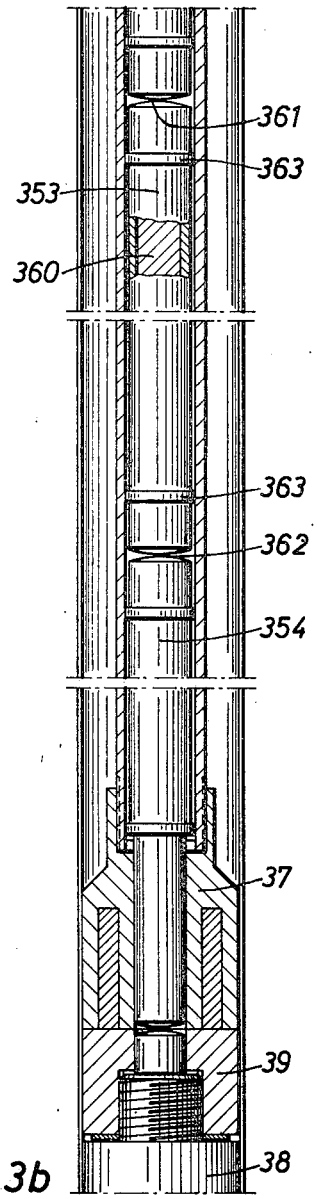

Another type of design pursuant to the invention, is shown in FIG. 3a and FIG. 3b, where mounted on a cover plate 31 is a holding device 32 which supports the impulse generator 33 which acts on the short circuit ring 34. In the case of this type of design, however, a number of impulse transmitter units 351, 352, 353 and 354, are connected between the impulse generator 33 and the shutdown rod 38 (FIG. 3b), and the masses of the said impulse transmitters are so graduated as to assure an optimal utilization of energy. Consequently, one or more sleeves 36 are provided for the guidance of the said impulse transmitters. Similarly to the arrangement of FIG. 2, the sleeves support the retaining device 37 which works in conjunction with a magnetic head 39 on the shutdown rod 38. The entire assembly is then encompassed by a casing 40. Since the shutdown ram 25 (FIG. 2) and 351 (FIG. 3a) must cover but a short distance in order to transmit the impulse, it has a flange-like attachment 355 lodged above an elastic supporting ring 356 and resting against a respective attachment of the sleeve 26 (FIG. 2) and 36 (FIG. 3a).

The transmitting units (FIGS. 3a and 3b) 351, 352, 353, and 354, can be constructed as is indicated for the transmitting unit 353. As is here shown, the transmitting unit is formed of an outer shell of hard, elastic, metallic material, and the shell is filled with material having a specific gravity relatively high to that of the material of which the shell is formed. Here, the shell is filled with lead filler 360. If desired, just the working ends 361 and 362 of the transfer unit can be formed of the hard, elastic, metallic material. The transmitting unit is provided with guide ring 363 for guiding the transmitting unit in the surrounding sleeve.

Figure 4:
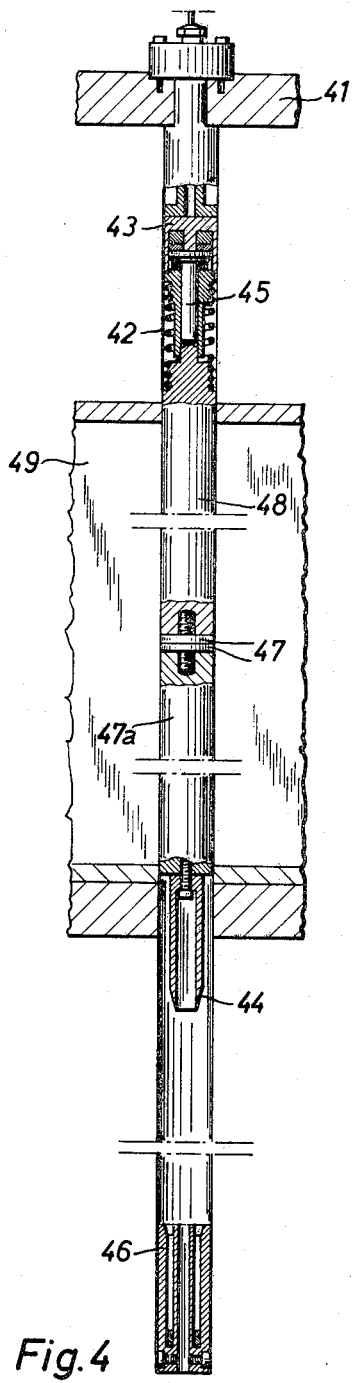
FIG. 4 is an elevation view, in cross-section, showing still another embodiment of the device of the invention.

FIG. 4 shows a further feature of the invention, wherein a fuel element comprises the safety rod 47a, which is formed of fissionable material, and upper member 48. The upper member is interposed between the impulse generator 43 and the safety rod 47a. The fuel element is divided at the center. Here the two parts are held in their operating position with the aid of a retaining means in the form of a pair of holding magnets 47. The safety element is again secured to a cover plate 41. The impulse generator 43 is designed identically with those employed in the types of design described in the foregoing. By means of the ram 45 the impulse generator 43 imparts the impulse to the upper member 48 of the fuel element which is capable of executing a movement counter to the force of a spring 42, being, however, coupled with the retaining device 47 via the spring. The retaining device 47 is located near the center, that is to say in the critical sector of the fission zone 49, so that on the actuation of the safety device, fuel is thrust out of the fission zone with the utmost speed. Provided at the end of the safety rod 47a is a buffer device 44 which, in combination with a second buffer device 46, absorbs the kinetic energy at the termination of the path of travel is a buffer device 44, 46.

The force provided by the impulse generator for displacing the lower part 47a of the safety rod is at least as great as the retaining force of the retaining means 47, and operation of the impulse generator serves to overcome the retaining force of this retaining means, as the retaining means 47 remains operative upon operation of the impulse generator.

While the invention has been described with respect to particular embodiments thereof, these embodiments are merely representative and do not define the limits of the invention.

An impulse generator as is suitable for the purposes of the invention is described in German DAS 1,091,207, and a circuit as is shown there can be utilized in the device of the invention. The generators used in accordance with the invention generate the accelerating force as a repulsive force.

Figure 5:
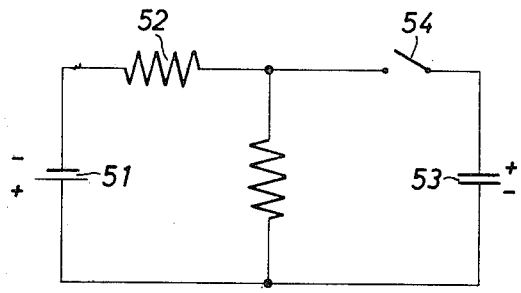
FIG. 5 is a circuit diagram illustrating a common coil.

The circuits for devices having separate coils represented by the invention are described in literature. For a device with a common coil the corresponding circuit is described in FIG. 5. The retaining circuit consists of a battery 51, impedance coil 52 and the common coil. The impulse circuit consists of a capacitor 53 discharged via a switch 54 and the common coil.

What is claimed is:
1. A device for shutdown of nuclear reactors comprising:
   (a) a safety rod movable axially between a first position for normal operation of the reactor and a second position for shutdown of the reactor;
   (b) retaining means retaining the safety rod in the first position during normal operation;
   (c) impeller means for actuation to accelerate movement from the first position to the second position, said impeller means comprising an electromagnetic impulse generator;
   (d) a fuel element, said fuel element comprising a first member and a second member, the second member being the safety rod, the first member being interposed between the safety rod and the impulse generator, said retaining means for the safety rod interconnecting the said first member and said second member.

2. A device according to claim 1, the division between the said first member and the said second member being after the first third of the fuel element length from the top of the fuel element.

3. A device according to claim 1, the retaining means interconnecting the fuel element first member and second member being a permanent magnet connecting means.

4. A device according to claim 1, said impulse generator comprising an output ram for impulse generator output, said device further including an impulse transmitting unit interposed between the impulse generator output ram and the safety rod for transmission of impulse from the ram to the safety rod.

5. A device according to claim 4, and including at least two of said transmitting units.

6. Apparatus according to claim 4, said transmitting unit having the working ends thereof formed of hard, elastic, metallic material.

7. A device according to claim 4, said transmitting unit comprising a shell of hard, elastic, metallic material, said shell containing a material of specific gravity relatively high with respect to the specific gravity of the material of the shell.

8. A device according to claim 4, the transmitting unit being of cylindrical form.

9. A device according to claim 1, the impelling force of the impulse generator being at least as great as ten times the force retaining the safety rod in said first position, said retaining means being operative during operation of the impeller means, the impeller means, upon operation overcoming the retaining means.

10. A device according to claim 1, said retaining means being operative during operation of the impeller means, the impeller means, upon operation overcoming the retaining means.

11. A device according to claim 1, the said retaining means being an electromagnetic retaining means, and the impulse generator being an electromagnetic impulse generator, said electromagnetic retaining means and electromagnetic impulse generator having a common coil.

12. A device according to claim 11, a circuit for the retaining means, said circuit including the said common coil, a circuit for the electromagnetic impulse generator, said impulse generator circuit including also the said coil.

13. A device according to claim 12, the polarity of the common coil in the retaining means circuit being opposite to the polarity of the said common coil in the impulse generator circuit.

14. A device according to claim 1, said impulse generator including a short circuit winding, and an output ram for transmitting impulse of the impulse generator, said short circuit winding being fixedly connected to said output ram.

References Cited
UNITED STATES PATENTS

| | | | |
|---|---|---|---|
| 1,384,769 | 7/1921 | MacLaren | 310—13 |
| 1,565,895 | 12/1925 | Blaustein | 310—14 |
| 2,958,025 | 10/1960 | De Villiers et al. | 310—14 |
| 3,162,796 | 12/1964 | Schreiber et al. | 176—36 |

FOREIGN PATENTS 1,213,495   4/1960   France.

OTHER REFERENCES

Kapl-M-LBV-7, 1957, pp. 33, 34, 36, 37, 39–43.
Schultz: "Control of Nuclear Reactors and Power Plants," 1955, pp. 108, 109, 113–120.

CARL D. QUARFORTH, Primary Examiner
HARVEY E. BEHREND, Assistant Examiner

U.S. Cl. X.R.

176—22, 86; 310—14

PO-1050
(5/69)

UNITED STATES PATENT OFFICE
CERTIFICATE OF CORRECTION

Patent No. 3,483,082          Dated December 9, 1969

Inventor(s) Peter Dosch, et al

It is certified that error appears in the above-identified patent and that said Letters Patent are hereby corrected as shown below:

1. Col. 1, lines 31-32, cancel "with the aid of an electromagnet, peller device is used to accelerate the rods." and substitute therefor --to the shutoff position, and an impeller device is used to accelerate the rods.--

SIGNED AND
SEALED
MAY 12 1970

(SEAL)
Attest:

Edward M. Fletcher, Jr.

Attesting Officer

WILLIAM E. SCHUYLER, JR.
Commissioner of Patents